United States Patent [19]

Jakob

[11] Patent Number: 5,724,706
[45] Date of Patent: Mar. 10, 1998

[54] DISCONNECTABLE AND RECONNECTABLE COUPLING DEVICE

[75] Inventor: Horst Jakob, Deaux, France

[73] Assignee: ASER, Saint-Chamond, France

[21] Appl. No.: 666,433

[22] PCT Filed: Nov. 17, 1995

[86] PCT No.: PCT/FR95/01519

§ 371 Date: Sep. 16, 1996

§ 102(e) Date: Sep. 16, 1996

[87] PCT Pub. No.: WO96/16279

PCT Pub. Date: May 30, 1996

[30] Foreign Application Priority Data

Nov. 21, 1994 [FR] France ................... 94 13918

[51] Int. Cl.[6] .................................................. F16G 3/00
[52] U.S. Cl. ............................ 24/38; 24/31 C; 24/33 L
[58] Field of Search ......................... 24/38, 31 C, 33 L

[56] References Cited

U.S. PATENT DOCUMENTS

| 1,303,027 | 5/1919 | Carr | 24/38 |
|---|---|---|---|
| 3,300,826 | 1/1967 | Read | 24/38 |
| 3,744,095 | 7/1973 | Tomlinson . | |

FOREIGN PATENT DOCUMENTS

| 1 140 516 | 7/1957 | France . |
|---|---|---|
| 2 706 964 | 12/1994 | France . |
| 548 209 | 9/1942 | United Kingdom . |
| 708 461 | 5/1954 | United Kingdom . |

*Primary Examiner*—Victor N. Sakran
*Attorney, Agent, or Firm*—Browdy and Neimark

[57] ABSTRACT

The invention concerns a disconnectible and reconnectible junction device for conveyor band made up of two flat flexible elements (A, a) presenting at the front side complementary shapes capable of interleaving in one same plane, connected rearwardly to the ends of a conveyor band, by sticking, vulcanization, riveting, clamping, thermoplastic molding, or formed directly by moulding over the ends of the conveyor band, each one of the flexible elements comprising at the front side oblong strips ($L_1$, $L_2$, $L_3$, $l_1$, $l_2$, $l_3$) in the longitudinal direction, separated by notches ($E_1$, $E_2$, $E_3$, $e_1$, $e_2$, $e_3$) of a shape complementary to those of the strips, the said strips comprising aligned holes (1) capable of receiving at least two and preferably several linking stems which cross through them in an approximately transversal direction, and being made of an elastomer material reinforced by one or several reinforcement layers (1) to which adheres the elastomer material, the number of junction stems and their spacing in the longitudinal direction being chosen in relation, on the one hand with the forces to be transmitted by the conveyor band and on the other hand by the adherence of the elastomer material surfaces to the reinforcement layer on reinforcement layers surfaces.

Figure for the Summary: 1.

17 Claims, 6 Drawing Sheets

DISCONNECTABLE AND RECONNECTABLE COUPLING DEVICE

BACKGROUND OF THE INVENTION

TECHNICAL FIELD OF THE INVENTION

The present invention concerns a disconnectible and reconnectible jointing device for a conveyor band made up of two flat flexible elements assuming at thin front end complementary shapes capable of interleaving in one same plane, linked rearwardly by sticking, vulcanization, riveting, clamping thermoplastic welding, to the ends of a conveyor band, or formed directly by molding on the ends of the conveyor band, characterised by the fact that each one of the flexible elements comprises it the front end oblong strips in the longitudinal direction, spaced apart by notches of complementary shape with respect to those of the strips, the said strips comprising aligned holes capable or receiving at least two and preferably several linking stems which cross through the holes in an approximately transversal direction and made of an elastomer material, reinforced by one or several reinforcement layers, to which adheres the elastomer material, the number of jointing stems and their spacing in the longitudinal direction being selected on the one hand in relation with the forces to be transmitted by the conveyor band and on the other hand in relation with the adherence of the elastomer material surfaces to the reinforcement layer or reinforcement layers surfaces.

By way of convention, longitudinal, means here the longitudinal direction of the conveyor band on which the elements of the junction device according to the invention are to be mounted or inserted, whether or not these elements are already placed on the conveyor band. Transversal direction means the direction at right angle to the longitudinal direction as defined hereabove.

Also, by way of convention, forward means hereafter the side of a junction device element located opposite to the end of the conveyor band and rearward means, the side of a junction device element located towards the conveyor band.

SUMMARY AND OBJECT OF THE INVENTION

The increasing diversity of the utilisation fields implies the provision of conveyor bands, specifically designed for different utilisation fields. The present invention aims to propose junction devices, the structure of which is such that it enables an easy adaptation of the properties of flexibility and of tensile strength opposed to the forces exerted on the longitudinal direction over the conveyor bands in the various fields of utilisation. Furthermore, the junction devices according to the invention must withstanding without damage and without appreciable wearing the tensile forces acting on their upper part and the compression forces acting on their lower part during the passage of these latter over the rollers (either driving or idle). These forces are due to the difference of path covered respectively by the upper part and by the lower part, as explained further on in connection with the figures showing embodiments of the invention.

The present invention aims also to propose methods for manufacturing the junction devices according to the invention, and methods for their implementation.

The strips of the junction device elements may be of various shapes provided the notches which separate the strips have a shape complementary to those of the strips in order to be capable of receiving the strips of the other element of the junction device. The simplest shape is the rectangular one. In this case the strips located on the edges may have exactly the same shape as those located further towards the middle of the junction device elements. However, in practice, trapezoidal shapes are preferred, where the front side is smaller than the one adjacent to the rear part of the junction device element. These trapezoidal shapes enable an easier interleaving of the strips belonging alternately to each one of the junction device elements, the insertion of these strips in the notches of complementary shape being easier. This last shape is shown further on on the drawings representing the embodiments described. Other shapes are also acceptable, the sole condition to be complied with, being that the shape of the notches be complementary to that of their associated strips. The manufacturing methods defined further on enable to carry out easily these shapes, whether obtained by cutting methods or by molding methods.

The transmission of the efforts of the strips of one junction device element to the strips of the other junction device element is carried out through the linking stems. Such connecting stems are known from previous junction devices. However, since at least two linking stems, spaced longitudinally with respect to the strips of the junction device elements are available, though, moreover the best results are obtained by using several linking stems spaced longitudinally with respect to the junction devices, this enables to take advantage of the elastomer material adherence over the reinforcement layer or layers. The adherence surfaces of the elastomer material over the reinforcement layer or layers, between two successive linking stems, provided for transmitting the forces which tend to <<peeling off>> the reinforcement layer or layers by unhooking the constituent material, may be computed and implemented in practice without difficulty, the strips length enabling the positioning of the linking stems, without major dimensional constraints, in relation with the forces to be transmitted in each particular case of the application for which a junction device has been designed. Last, as it will appear further on, in the presentation of embodiments which will be described in detail, two ways of solving the problem set by the passage of the rollers may be considered. The first one consists in using two reinforcement layers, woven or knitted, or made up of cables arranged on both sides of the holes provided for the linking stems. On account of the path difference between the external part of the junction devices and the internal part of the junction devices during their passage over the rollers (external meaning located opposite to the rollers and internal meaning on the rollers side), the reinforcement layers present a certain extensibility in the longitudinal direction of the junction device, with a limit beyond which the reinforcement is no more extended and presents an important tensile strength, and returns back to its normal longitudinal dimension, through its own elasticity, but also by the fact of being brought back under the action of the elasticity of the elastomer material which adheres to it.

This property of the reinforcement may be obtained, when weaving is used, by weaving intentionally the weft or the warp loosely, this method being known as <<loose weaving of the weft or the warp>> (embubage) and in the case of knitting, by intentionally knitting the stitches moderately tightened and possibly by incorporating to the knitting warp, yarns moderately stretched, which constitute a limit to the extensibility of the knitting, since they are stretched when submitted to a tensile force exerted on the junction device element and through it, to its knitted reinforcement. In the case where cables are used, these latter may be placed according to a sinusoidal or zigzag arrangement.

The second method is based on the use of only one single reinforcement layer, either woven or knitted, or made up with cables in zigzag or sinusoidal bow arrangement, passing alternately under a linking stem hole or above the next linking stem hole, and so on, the ends of the layers parts located in the strips, being bent back around the linking stem hole, located the closest to the end of each strip and being brought back to the rear over a certain distance. Such an arrangement avoids the problems related to the path difference, during the passage over the rollers, respectively of an external layer and of an internal layer. However, the tensile strength obtained by the adherence of the elastomer material surfaces is not as high as in the case where two layers are provided. The choice will depend generally upon the field of utilisation and in relation with the properties of the conveyor band for which the junction device is provided. In what concerns the fastening of the junction device elements to the ends of the conveyor band, numerous solutions are possible. These solutions are known and are not part of the claims of the present invention. It concerns riveting, screwing, sticking, vulcanization, thermoplastic welding of the rear parts of the junction device elements on the conveyor band. A preferred method is vulcanization, when using the so-called serrated vulcanization method. However the stepped vulcanization method may be used as well, or the vulcanization method based upon the insertion of the rear part of the junction element in a slit formed approximately in the median plane of the conveyor band end.

BRIEF DESCRIPTION OF THE DRAWINGS

Several embodiments of the junction device according to the invention, will be now described, in relation with the drawing figures in which.

DETAILED DESCRIPTION OF THE PREFERRED EMBODIMENTS OF THE INVENTION

Figure 1:
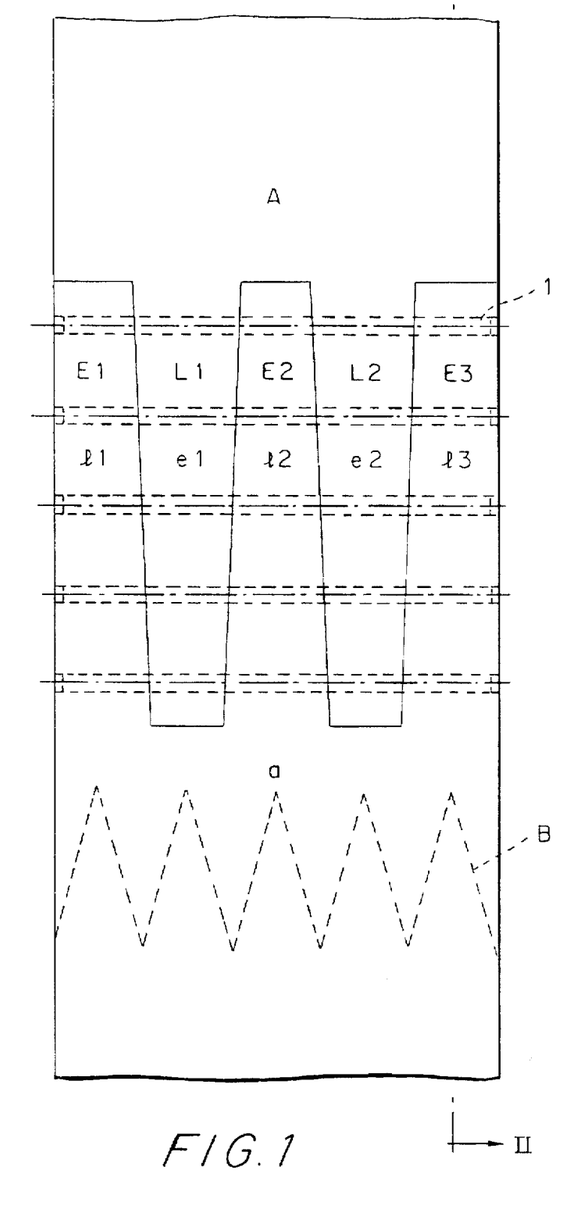
FIG. 1 is a plane view of a junction device.
Figure 2:
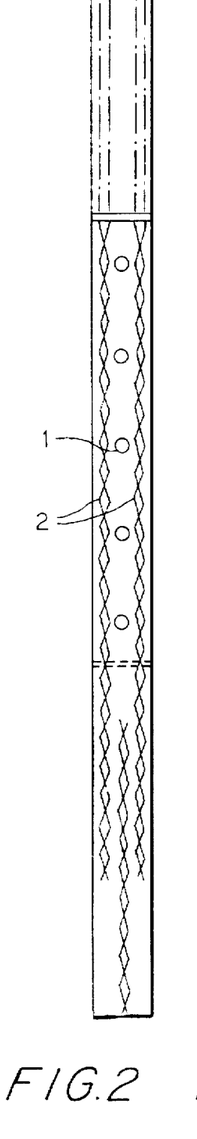
FIG. 2 is a cross section of the junction device shown on FIG. 1, along the cross section line II—II.

FIGS. 1 and 2 show a first embodiment of the junction device according to the invention. The strips $l_1$, $l_2$, and $l_3$ of a junction device element a can be identified therein, together with the strips $L_1$ and $L_2$ of the other junction device element A, as well as the notches $E_1$, $E_2$, $E_3$ completely filled by the strips $l_1$, $l_2$, and $l_3$ and the notches $e_1$ and $e_2$ completely filled by the strips $L_1$ and $L_2$. The holes 1 provided for the linking stems are represented by dashed lines and by an axial chain-dotted line.

Five strips are provided in the example shown (three plus two) although practically several more are provided. In the same way, five holes are provided for linking stems in the junction device; a different number can be provided. The spacing between the holes for linking stems can also be different. The cross section of FIG. 2 shows two woven layers 2 arranged on both sides of the linking stems holes 1. The elastomer material, or the plastic material which encompasses the reinforcement layers and which adheres to these latter, is vulcanized or injected. The connection B of the junction device elements to the conveyor band is shown schematically. It concerns a link obtained by serrated vulcanization, well known by the specialists. However, as mentioned hereabove, other fastening methods can be provided.

Figure 3:
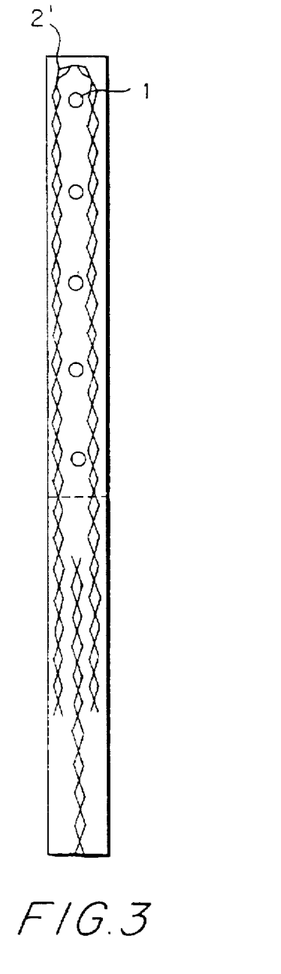
FIG. 3 is a first alternative embodiment of the junction device of FIG. 1, shown by a cross section of one of the strips of this latter.

FIG. 3 shows a second embodiment of the invention, in which a reinforcement layer 2' is bent back at the strip end and is brought back in the opposite direction after passing around the connecting stem hole 1 located at the utmost end of the strip, thus forming two reinforcement layers on both sides of the linking stems.

Figure 4:
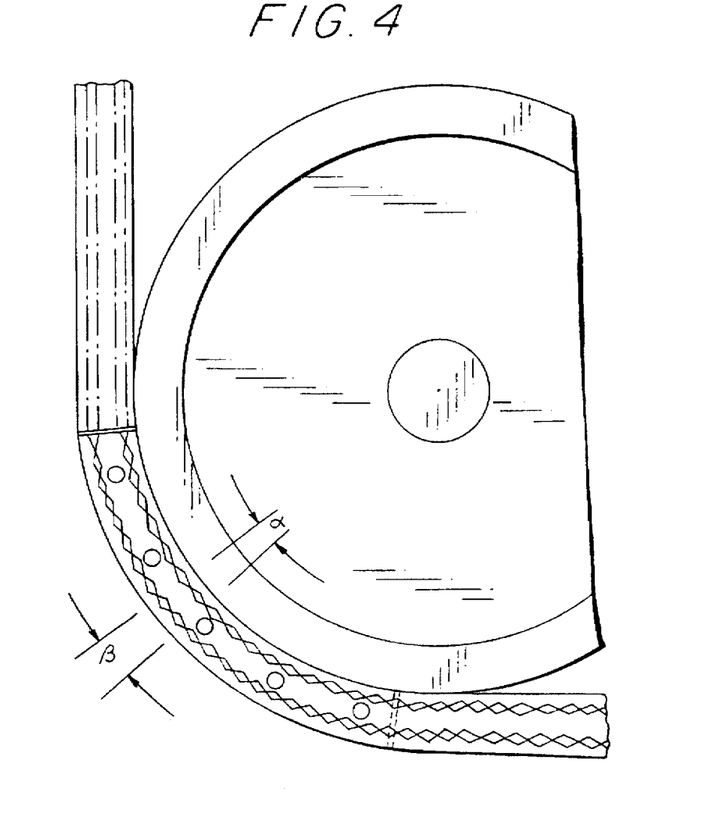
FIG. 4 is a cross section of a conveyor band provided with a junction device according to the invention during its passage over a roller.
Figure 5:
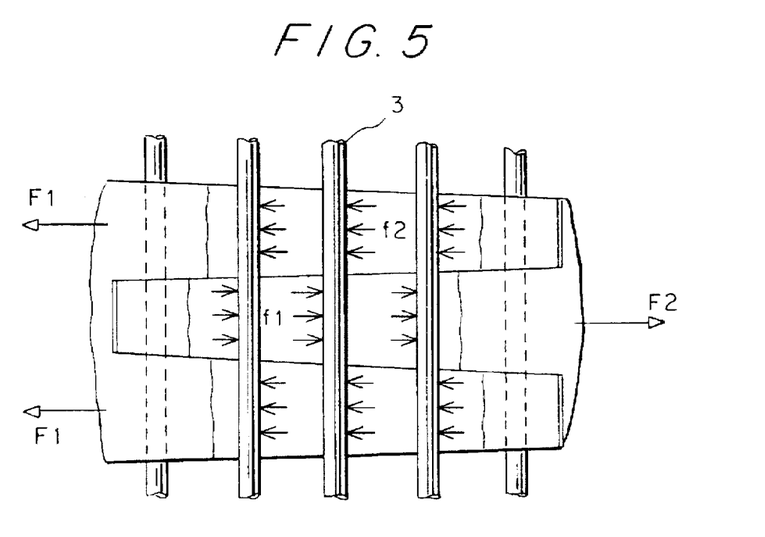
FIG. 5 shows schematically how the tensile and compression forces are applied to a junction device according to the invention.

FIGS. 4 and 5 show a junction device according to the invention, in state of operation. FIG. 4 shows that the path covered by the lower reinforcement layer (arc α) is shorter than the path covered by the upper reinforcement layer (arc β) due to the difference of radius. FIG. 5 shows the way of operation of a junction device mounted on a conveyor band. The linking stems 3 which connect the strips belonging to the two elements of the junction device, by resisting to the tensile forces exerted over the junction device elements (shown by thick arrows $F_1$ and $F_2$ and by small arrows $f_1$ and $f_2$) in opposite directions, cause the compression of the intermediate layer parts located between two reinforcement layers and comprising transversal holes provided for the linking stems 3. This compression is absorbed, on the one hand thanks to the material elasticity and on the other hand because of the adherence of the elastomer material to the reinforcement layers, by the reinforcement layers having themselves a certain elasticity or at least a limited extensibility as mentioned hereabove. The adherence surface of the material to the layers between two stems is computed in such a way that the forces, exerted at the passage over the rollers or in the case of operation jerks, are transmitted to the reinforcement layers without any risk of <<peeling>> i.e. of unsticking the elastomer material from the layers. In the case where one single reinforcement layer is provided, which passes alternately above and below the linking stems holes 1, the same phenomenon occurs, the linking stems 3 causing a compression of the adjoining elastomer material. In this case too, the adherence surfaces or the material involved, between two linking stems 3 are computed in order to transmit the forces without any unsticking risk. With one single layer, the forces which can be absorbed without any risk are smaller than in the case of two layers. It is the reason why the choice between the two embodiments (with two layers or with one single layer) is determined by the requirements of the utilisation field and by the characteristics of the conveyor bands on which the junction devices are mounted or on which they are molded or vulcanized.

Figure 6:
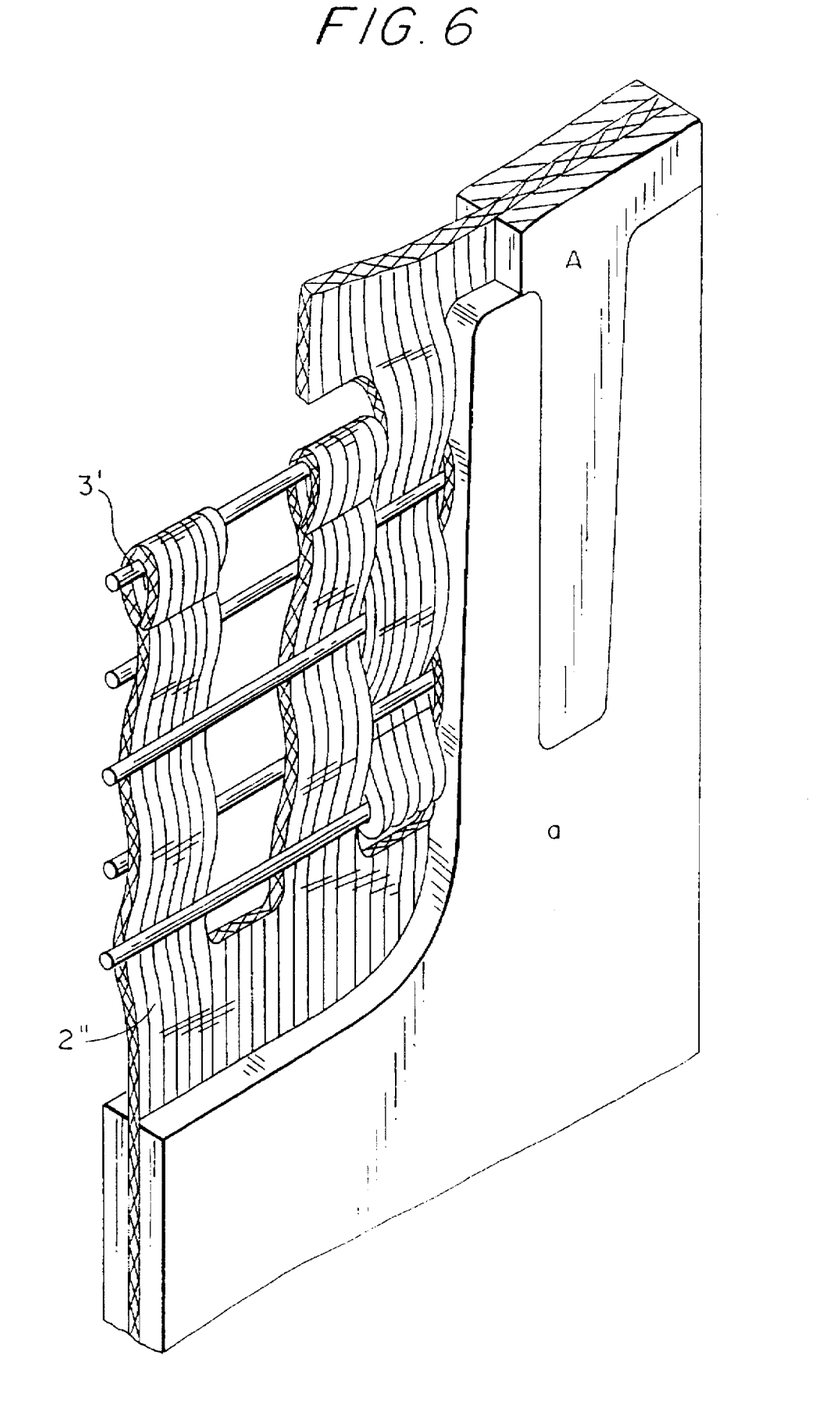
FIG. 6 is a perspective view of a second alternative embodiment of the junction device according to the invention, a part of the elastomer material being removed to present the reinforcement arrangement.

FIG. 6 shows an alternative embodiment of the junction device according to the invention. In this case, a single reinforcement layer 2" of the conveyor band, located approximately in the median plane of this latter, uncovered by the removal of the elastomer material on both sides of the conveyor band, is used as a single reinforcement layer, which passes alternately above and below the successive linking stem holes, provided in each one of the strips of a junction device element, being bent back around the hole of the nearest linking stem 3' with respect to the free end of the strips, and turned back on the other direction over a certain distance.

Such a configuration enables avoiding the problems related to the path difference between a reinforcement upper layer and a reinforcement lower layer. The single reinforcement layer 2", located approximately in the middle of the thickness of the junction device and of that of the conveyor band, does not require a longitudinal elasticity. It is the reason why it is generally envisaged for making up this single layer, to use the central reinforcement of a conveyor band made in this way, the junction device being molded over this single layer arranged as mentioned. However, it is also possible to make also junction devices with this type of reinforcement without using the stripped central reinforcement of the elastomer material of a conveyor band, the central reinforcement being arranged in each junction device element during the manufacture of these latter, the junction device elements being further connected to the ends of a conveyor band as proposed hereabove, according to various workable methods.

Figure 7:
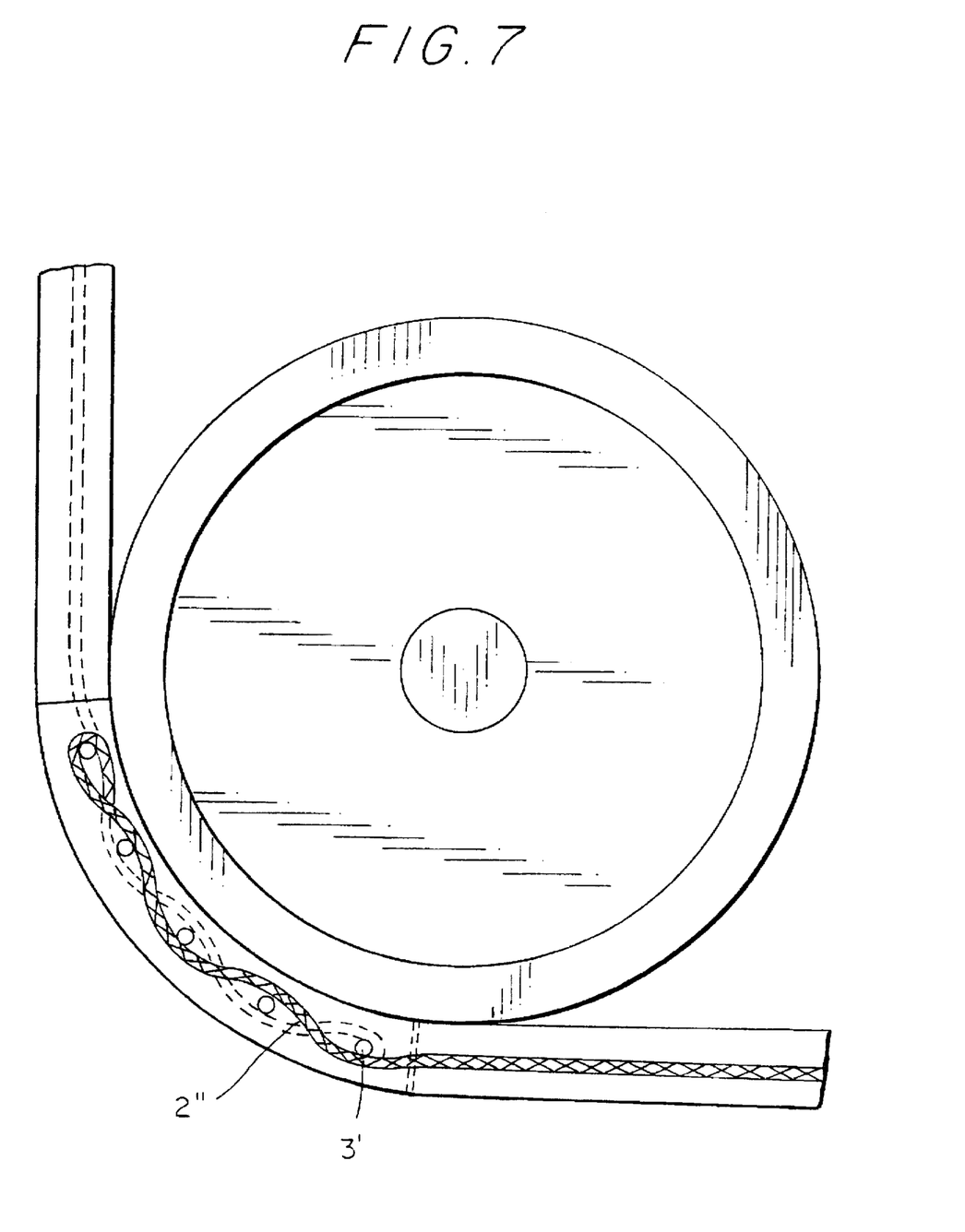
FIG. 7 shows a conveyor band comprising a junction device according to claim 6, already connected and passing over a roller.

FIG. 7 shows the passage over a roller of a junction device according to the embodiment shown on FIG. 6. It is understood that the radius differences are small and compensate each other, due to the passage of the reinforcement layer alternately above and below the linking stems holes and that the reinforcement layer must not necessarily be elastic, in this case. On the other hand, the jerks of the tensile forces exerted by the conveyor band are absorbed by the elasticity of the elastomer material adjoining the linking stems 3", the elasticity of the former being limited by its adherence to the reinforcement layer. In other words, the main causes of problems, i.e. the passage over the rollers and the jerks, are both solved with this embodiment.

Figure 8:
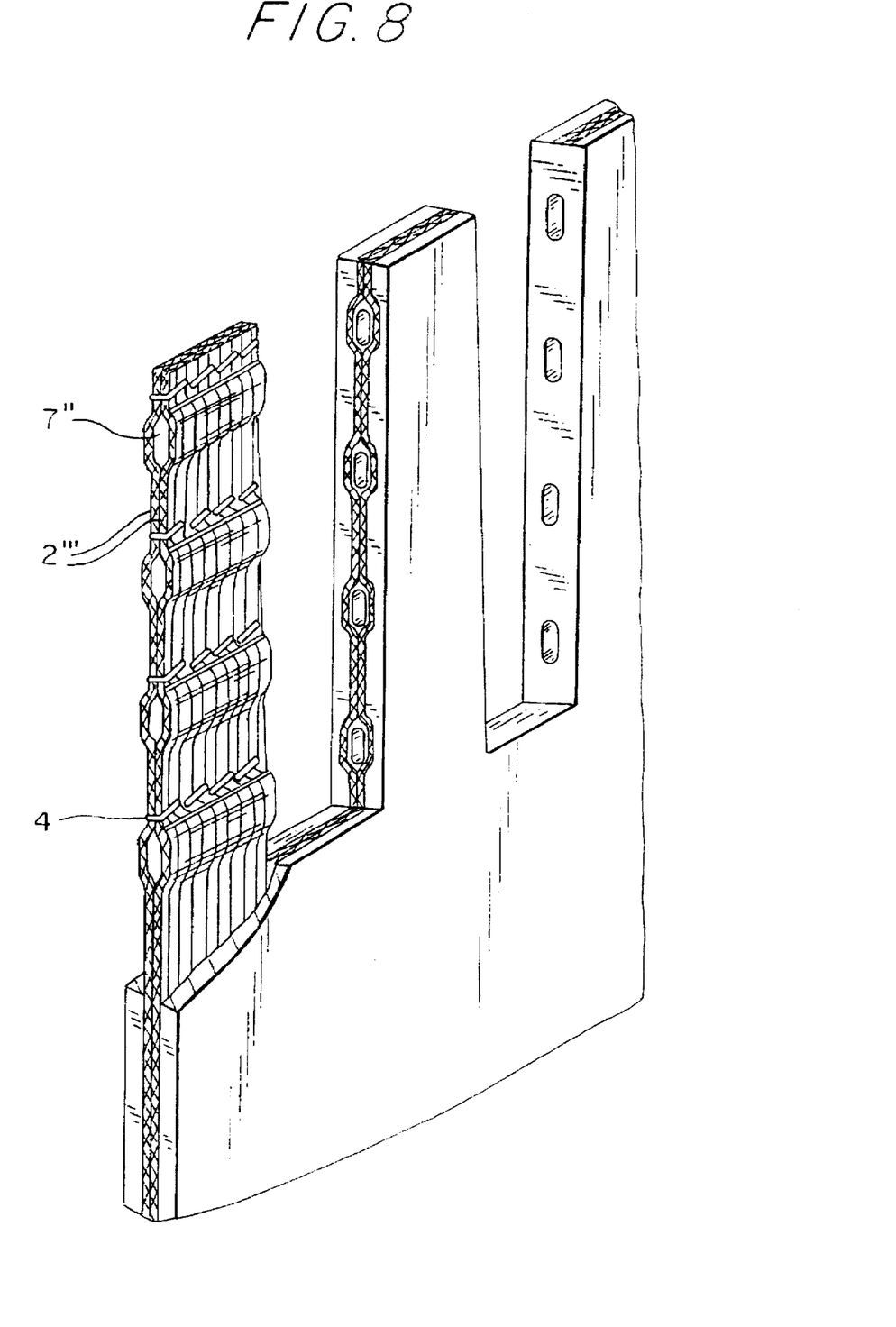
FIG. 8 is a third alternative embodiment of the junction device according to the invention, shown as a perspective view of an element fraction, a part of the elastomer material having been removed to present the reinforcement.

FIG. 8 shows another embodiment, in which two reinforcement layers 2''' are arranged, one against the other, being possibly separated by a thin layer of elastomer material and spaced apart at the location of the linking stem holes 1". A thin layer of material is provided between the holes and the layers which completely encompass them. In order to avoid a too sudden transmission of the forces in the region of the linking stems and to distribute these forces over the two layers, the two layers are connected at the front of each linking stem hole 1" by a transversal seam 4, which prevents their spacing apart. The transversal seams 4 may be advantageously replaced by welded or sticked connections. In this case, the adherence surface to the elastomer material layers between two linking stems, is also computed as mentioned previously for the other embodiments. It is desirable that the fabrics which make up the layers should be woven in such a way as the wefts are more loose than the warps or reversely, in the longitudinal direction of the junction device. If the layers are knitted, knitting should be advantageously of a limited extensibility.

Figure 9:
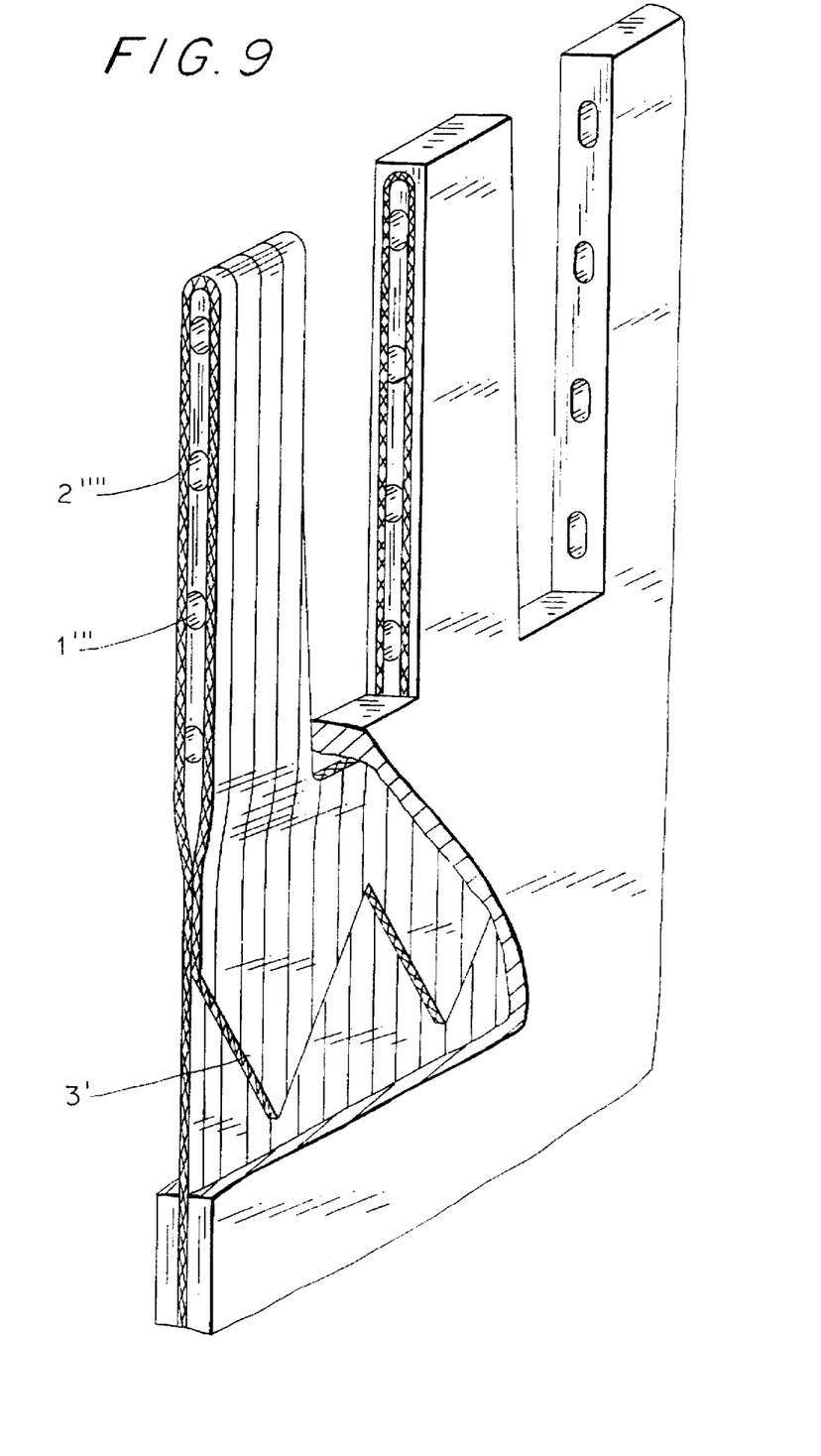
FIG. 9 is a perspective view of a fourth alternative embodiment of the junction device according to the invention, in the form of a fraction of element, a part of the elastomer material having been removed to present the reinforcement.

FIG. 9 shows another embodiment of the invention. The reinforcement, as in the case of the embodiment shown on FIG. 6, is that of the conveyor band, uncovered by the removal of the elastomer material of the conveyor band. But in this embodiment, the reinforcement 2"" extends first on one same side of the linking stems holes 1''', turns around the utmost forward linking stem hole 1''', then extends above the linking stem holes and of its first layer, thus forming a second reinforcement layer on the other side of the linking stem holes. The end of the second layer, brought back against the first layer, is advantageously cut out to form serrated or sinusoidally shaped indentations b.

In this embodiment, as different from the embodiment of FIG. 6, it is desirable that the reinforcement has elasticity and/or extensibility properties, since it will be observed that during the passage over the rollers, the path of the upper reinforcement layer is longer than that of the lower layer, due to the radius difference.

For the construction of the junction elements according to the invention, it is possible as a first step to mould, or to vulcanize, a junction device the elements of which form at this stage one single piece, in a mould comprising moving spindles set into position for leaving free the transversal holes in the further strips, then as a second step, once the spindles are removed after the moulding or the vulcanization, the notches and the strips are formed by cutting out their contours by means of a suitable tool, thus separating in that way the two junction device elements.

During the moulding or the vulcanization of the junction device, at the first step, it is possible to take advantage of the moulding or of the vulcanization, in order to carry out, in one same operation, the junction by moulding or by vulcanization to the ends of the conveyor band.

However, it is also possible to mould or to vulcanize independently, the complementary elements of the junction device. In this case, it is also possible to carry out, during the same moulding or vulcanization operation, the junction of each element of the junction device respectively with one of the ends of the conveyor band.

Obviously, this last method which consists in moulding independently the complementary elements of the junction device, is the only possible one, in the case where the conveyor band reinforcement is used as the reinforcement of the junction device elements.

In what concerns the manufacturing of the elements of the junction device according to the fourth embodiment (FIG. 9), it is possible to operate as follows:

a) removal of the elastomer material on both sides of the approximately central reinforcement, at the end of the conveyor band, b) cut-out in this reinforcement 2"" of longitudinal notches of a shape corresponding approximately, on half of the length, to that of the next notches, the shapes of these notches being on the other half of their length symmetrical to that of the first half, with respect to a symmetry line dividing the two halves, c) laying out of the reinforcement layer thus prepared below the moving spindles of the vulcanization or injection mould, provided for leaving free the junction stems holes 1''', bending back of the reinforcement layer beyond and around the moving spindle located the most forwardly, laying out of the reinforcement layer above the moving spindles of the vulcanization or injection mould, thus forming a second reinforcement layer, application of the reinforcement layer end against the first layer, d) vulcanization or injection of a material similar to that of the conveyor band or at least compatible with this latter.

I claim:

1. Disconnectible and reconnectible junction device for a conveyor band, said junction device having two flat elements of complementary shapes, each of the two flat elements having oblong strips directed respectively towards a front of each of the two flat elements and connected in a longitudinal direction to a rear part of the element, the two flat elements separated one from the other by notches of a shape complementary to those of the corresponding strips of the other element, the strips of each one of the elements having a plurality of transversal holes for linking stems, said linking stems being spaced apart in a transversal direction to the conveyor band and which are located approximately in the middle of the thickness of the strips, each of said plurality of transversal holes spaced one from the other in the longitudinal direction, in such a way that when the strips of the two elements are in an interleaved position, the plurality of transversal holes are in alignment, the junction device further comprising reinforcement means formed from at least two layers, said reinforcement means adhering to a constituent material of the junction device, wherein the reinforcement means comprises two layers located inside the junction device elements in two planes parallel one to the other and parallel to faces of the junction device, above and below the plurality of transversal holes 1 for the strip fastening stems and extending to the rear part of the elements, the reinforcement layers being flexible and providing in the longitudinal direction of the junction device a controlled extensibility conferring to the junction device first elasticity properties in combination to second elasticity properties of the constituent material of the junction device.

2. Junction device according to claim 1 wherein that the two reinforcement layers (2) of each junction device element are arranged one against the other, being spaced apart at the location of the linking stems holes (1), in such a way that the linking stems holes are left open between the two reinforcement layers (2), spaced apart at this location, a transversal strengthening seam (3), or a transversal welded or sticked connection being formed at the immediate front of the linking stems holes.

3. Junction device according to claim 1 wherein the reinforcement layers are made up with a knitting including besides the rows of stitches, strong warp threads arranged longitudinally, loosely inserted in the knitted fabric in course of knitting.

4. A junction device according to claim 1 wherein the junction device elements of complementary shapes are moulded or vulcanized each one separately in a respective mould comprising moving spindles mounted transversally and crossing successively through hollow spaces of the mould corresponding to the strips and solid spaces of the mould corresponding to the notches, these moving spindles being removed before the stripping.

5. A junction device according to claim 4 wherein the two complementary elements of the junction device are first vulcanized or moulded thus forming one single piece, moving spindles being set into position in the mould for leaving open the transversal holes in the strips, then once the moving spindles removed after moulding or vulcanization, the strips and the notches are formed by cutting their contours by means of a suitable tool, thus separating the two elements of the junction device.

6. A junction device according to claim 5 wherein the linking to the conveyor band of the junction device elements is carried out by moulding or vulcanization, directly over the ends of a conveyor band during the moulding or the vulcanization of the elements.

7. A junction device according to claim 4, wherein the linking to the conveyor band of the junction device elements is carried out by moulding or vulcanization, directly over the ends of a conveyor band during the moulding or the vulcanization of the elements.

8. Disconnectible and reconnectible junction device for a conveyor band, said junction device having two flat elements of complementary shapes, each of the two flat elements having oblong strips directed respectively towards a front of each of the two flat elements and connected in a longitudinal direction to a rear part of the element, the two flat elements separated one from the other by notches of a shape complementary to those of the corresponding strips of the other element, the strips of each one of the elements having a plurality of transversal holes for linking stems, said linking stems being spaced apart in a transversal direction to the conveyor band and which are located approximately in the middle of the thickness of the strips, each of said plurality of transversal holes spaced one from the other in the longitudinal direction, in such a way that when the strips of the two elements are in an interleaved position, the plurality of transversal holes are in alignment, the junction device further comprising reinforcement means formed from at least two layers, said reinforcement means adhering to a constituent material of the junction device, wherein the reinforcement means comprises two layers located inside the junction device elements in two planes parallel one to the other and parallel to faces of the junction device, above and below the plurality of transversal holes 1 for the strip fastening stems and extending to the rear part of the elements, the reinforcement layers being flexible and providing in the longitudinal direction of the junction device a controlled extensibility conferring to the junction device first elasticity properties in combination to second elasticity properties of the constituent material of the junction device;

wherein the two reinforcement layers (2) of each junction device element are arranged one against the other, being spaced apart at the location of the linking stems holes (1), in such a way that the linking stems holes are left open between the two reinforcement layers (2), spaced apart at this location, a transversal strengthening seam (3), or a transversal welded or sticked connection being formed at the intermediate front of the linking stems holes.

9. Junction device according to claim 8 wherein the reinforcement layers are made up with a knitting including besides the rows of stitches, strong warp threads arranged longitudinally, loosely inserted in the knitted fabric in course of knitting.

10. Disconnectible and reconnectible junction device for a conveyor band, said junction device having two flat elements of complementary shapes, each of the two flat elements having oblong strips directed respectively towards a front of each of the two flat elements and connected in a longitudinal direction to a rear part of the element, the two flat elements separated one from the other by notches of a shape complementary to those of the corresponding strips of the other element, the strips of each one of the elements having a plurality of transversal holes for linking stems, said linking stems being spaced apart in a transversal direction to the conveyor band and which are located approximately in the middle of the thickness of the strips, each of said plurality of transversal holes spaced one from the other in the longitudinal direction, in such a way that when the strips of the two elements are in an interleaved position, the plurality of transversal holes are in alignment, the junction device further comprising reinforcement means formed from a layer adhering to a constituent material of the junction device, wherein the reinforcement means comprise one single reinforcement layer, arranged generally in an area surrounding the median plane, this single reinforcement layer passing alternately above and below the transversal holes, the reinforcement layer being bent back around each one of the transversal holes located closest to each one of free ends of the strips; said single reinforcement layer providing in the longitudinal direction of the junction device a controlled extensibility conferring to the junction device first elasticity properties in combination to second elasticity properties of the constituent material of the junction device.

11. A junction device according to claim 10 wherein the junction device elements are moulded or vulcanized over the ends of the conveyor band previously uncovered of the conveyor band constituent material, the remaining reinforcement layer being cut into narrow strips the shape of which corresponds to that of the narrow strips of the junction device elements which are to be made and arranged in the mould, successively above and below moving spindles provided for leaving free holes for linking stems, the ends of the narrow strips being bent back around the spindle located at the free end of the future strips, the said moving spindles being removed before the stripping.

12. A junction device according to claim 10, wherein the junction device elements of complementary shapes are moulded or vulcanized each one separately in a respective mould comprising moving spindles mounted transversally and crossing successively through hollow spaces of the mould corresponding to the strips and solid spaces of the mould corresponding to the notches, these moving spindles being removed before the stripping.

13. A junction device elements made according to claim 12, wherein the linking to the conveyor band of the junction device elements is carried out by moulding or vulcanization, directly over the ends of a conveyor band during the moulding or the vulcanization of the elements.

14. Disconnectible and reconnectible junction device for a conveyor band, said junction device having two flat elements of complementary shapes, each of the two flat elements having oblong strips directed respectively towards a front of each of the two flat elements and connected in a longitudinal direction to a rear part of the element, the two flat elements separated one from the other by notches of a shape complementary to those of the corresponding strips of the other element, the strips of each one of the elements having a plurality of transversal holes for linking stems, said linking stems being spaced apart in a transversal direction to the conveyor band and which are located approximately in the middle of the thickness of the strips, each of said plurality of transversal holes spaced one from the other in the longitudinal direction, in such a way that when the strips of the two elements are in an interleaved position, the plurality of transversal holes are in alignment, the junction device comprising reinforcement means formed from one layer adhering to a constituent material of the junction device, wherein the reinforcement means of each element of the junction device is formed by the reinforcement of the corresponding end of the conveyor band, uncovered of an elastomer material of the conveyor band, the said reinforcement means being arranged in each junction device element in such a way as to extend above the transversal holes of the various strips thus forming a first reinforcement layer, and after passing around one of the transversal holes located the most forwardly, then to extend below the transversal holes, thus forming a second reinforcement layer, the reinforcement end being applied against the first layer at a rear of the junction device element; said single reinforcement layer providing in the longitudinal direction of the junction device a controlled extensibility conferring to the junction device first elasticity properties in combination to second elasticity properties of the constituent material of the junction device.

15. A junction device according to claim 14, made according to the following operations:
 a) removal of the elastomer material from both sides of the approximately central reinforcement, at the end of a conveyor band,
 b) cut-out in this reinforcement of longitudinal notches of a shape corresponding approximately, on one half of the length, to that of the future notches, the shape of these notches being, on the other half of their length, symmetrical to that of the first half with respect to a symmetry line dividing the two halves.
 c) arrangement of the reinforcement layer thus prepared, below the moving spindles of the vulcanization or injection mould, provided for leaving free the holes for junction stems, being back of the reinforcement layer beyond and around the moving spindle located in the utmost forward position, arrangement of the reinforcement layer above the moving spindles of the vulcanization or injection mould, thus forming a second reinforcement layer, application of the end of the reinforcement layer against the first layer,
 d) vulcanization or injection of a material similar to that of the conveyor band or at least compatible with this latter.

16. A junction device according to claim 14 wherein the junction device elements of complementary shapes are moulded or vulcanized each one separately in a respective mould comprising moving spindles mounted transversally and crossing successively through hollow spaces of the mould corresponding to the strips and solid spaces of the mould corresponding to the notches, these moving spindles being removed before the stripping.

17. A junction device according to claim 16, wherein the linking to the conveyor band of the junction device elements is carried out by moulding or vulcanization, directly over the ends of a conveyor band during the moulding or the vulcanization of the elements.

* * * * *